United States Patent
Kolluri et al.

(10) Patent No.: US 7,299,270 B2
(45) Date of Patent: Nov. 20, 2007

(54) INFERRING RELATIONS BETWEEN INTERNET OBJECTS THAT ARE NOT CONNECTED DIRECTLY

(75) Inventors: Venkateswarlu Kolluri, Shrewsbury, MA (US); Shan Balasubramaniam, Mountain View, CA (US); John Guidi, Westborough, MA (US); Alden Dorosario, Acton, MA (US); Andrei Kotlov, Woburn, MA (US)

(73) Assignee: Lycos, Inc., Waltham, MA (US)

( * ) Notice: Subject to any disclaimer, the term of this patent is extended or adjusted under 35 U.S.C. 154(b) by 651 days.

(21) Appl. No.: 09/902,421

(22) Filed: Jul. 10, 2001

(65) Prior Publication Data

US 2003/0101286 A1 May 29, 2003

(51) Int. Cl.
*G06F 15/16* (2006.01)
*G06F 7/00* (2006.01)

(52) U.S. Cl. .......................................... 709/218; 707/3

(58) Field of Classification Search ............. 707/104.1, 707/2–7; 709/218; 719/316; 715/513
See application file for complete search history.

(56) References Cited

U.S. PATENT DOCUMENTS

| | | | | |
|---|---|---|---|---|
| 5,197,005 A | * | 3/1993 | Shwartz et al. | 707/2 |
| 5,694,594 A | * | 12/1997 | Chang | 707/6 |
| 5,875,446 A | * | 2/1999 | Brown et al. | 707/3 |
| 5,920,859 A | * | 7/1999 | Li | 707/5 |
| 5,987,446 A | * | 11/1999 | Corey et al. | 707/3 |
| 5,999,929 A | * | 12/1999 | Goodman | 707/7 |
| 6,006,225 A | * | 12/1999 | Bowman et al. | 707/5 |
| 6,112,202 A | * | 8/2000 | Kleinberg | 707/5 |
| 6,138,113 A | * | 10/2000 | Dean et al. | 707/2 |
| 6,230,153 B1 | * | 5/2001 | Howard et al. | 707/2 |
| 6,275,820 B1 | * | 8/2001 | Navin-Chandra et al. | 707/3 |
| 6,286,006 B1 | * | 9/2001 | Bharat et al. | 707/100 |
| 6,304,864 B1 | * | 10/2001 | Liddy et al. | 706/15 |
| 6,505,191 B1 | * | 1/2003 | Baclawski | 707/3 |
| 6,523,019 B1 | * | 2/2003 | Borthwick | 706/45 |
| 6,571,231 B2 | * | 5/2003 | Sedlar | 707/1 |
| 6,591,261 B1 | * | 7/2003 | Arthurs | 707/2 |
| 6,636,848 B1 | * | 10/2003 | Aridor et al. | 707/3 |
| 6,647,386 B2 | * | 11/2003 | Hollines et al. | 707/8 |
| 6,751,612 B1 | * | 6/2004 | Schuetze et al. | 707/4 |
| 6,772,150 B1 | * | 8/2004 | Whitman et al. | 707/6 |

(Continued)

OTHER PUBLICATIONS

Search Engine Northern Light(R) Debuts News Ranking . . . , PR Newswire, New York, Oct. 25, 1999.*

(Continued)

*Primary Examiner*—Jason Cardone
*Assistant Examiner*—Ajay M Bhatia
(74) *Attorney, Agent, or Firm*—Fish & Richardson P.C.

(57) ABSTRACT

An inferred relation weighting process for determining the strength of an inferred relation between a first and a second Internet object which are not directly linked includes a first link weighting process for determining the strength of at least a first link between the first non-directly linked Internet object and a common object. A second link weighting process determines the strength of at least a second link between the second non-directly linked Internet object and the common object. An inferred relation weight calculation process calculates the strength of the inferred relation based on the strength of the at least a first link and the at least a second link.

33 Claims, 6 Drawing Sheets

U.S. PATENT DOCUMENTS

| | | | |
|---|---|---|---|
| 6,853,993 B2* | 2/2005 | Ortega et al. | 707/5 |
| 2001/0020238 A1* | 9/2001 | Tsuda | 707/5 |
| 2002/0065836 A1* | 5/2002 | Sasaki | 707/200 |
| 2003/0074369 A1* | 4/2003 | Schuetze et al. | 707/103 R |
| 2003/0101286 A1* | 5/2003 | Kolluri et al. | 709/316 |
| 2003/0177114 A1* | 9/2003 | Lin et al. | 707/3 |

OTHER PUBLICATIONS

Two-level document ranking using mutal information in natural lnaguage information retrieval, Hyun-Kyu Kan et al., Science Direct, Jun. 9, 1998.*

Associative information access using DualNAVI,, Takano A. et al, Digital Libraries . . . , Nov. 13, 2000.*

Erica Chisholm and Tamara G. Kolda,New Term Weighting Formulas for the Vector Space☐☐Method in Information Retrieval, Mar. 1999.*

Nick Craswell, David Hawking, Stephen Robertson, Effective site finding using link anchor information, SIGIR'01, Sep. 9-12, 2001, New Orleans, Louisiana, USA. ACM.*

Ralf Steinberger, Bruno Pouliquen, Johan Hagman, Cross-Lingual Document Similarity Calculation Using the Multilingual Thesaurus EUROVOC, Feb. 17-23, 2002. pp. 101-121.*

Brin, et al., "The Anatomy of a Large-Scale Hypertextual Web Search Engine," WWW7/Computer Networks 30 (1-7): 107-117 (1998), http://dbpubs.stanford.edu/pub/1998-8.

Ian Rogers, "The Google Pagerank Algorithm and How It Works," IPR Computing Ltd., http://www.iprcom.com/papers/pagerank/.

Phil Craven, "Google's PageRank Explained and how to make the most of it," http://www.webworkshop.net/paperank.html.

* cited by examiner

INFERRING RELATIONS BETWEEN INTERNET OBJECTS THAT ARE NOT CONNECTED DIRECTLY

TECHNICAL FIELD

This invention relates to the relations between Internet objects, both known and inferred.

BACKGROUND

The Internet is a phenomenal research tool in that it allows millions of users to access millions of pages of data. Unfortunately, as the number of web sites offering quality information and the quantity of information itself continues to grow, the Internet becomes more difficult to navigate.

The Internet, sometimes simply called the "Net", is a worldwide system of computer networks. That is, a network of networks in which users at any one computer can, if they have permission, get information from any other computer. Search engines are commonly used to search the web. Users of these search engines can submit their requests in the form of "queries". Whenever a user submits one of these queries to a search engine, a list of results is generated which includes hyperlinks that connect each search result to the appropriate Internet document.

The way in which these documents are ranked within the list of results (in relation to the query) is constantly evolving as the Internet continues to evolve. Initially, Internet search engines simply examined the number of times that a query search term appeared within the document, wherein the greater the number of times that a search term appeared, the more relevant the document was considered and the higher it was ranked within the list of results. Please realize that this method ranks documents in accordance with their relevance to the topic of the query.

More advanced ranking methods examine the quality of the documents themselves independent of the topic or query. Specifically, the number of links coming into a document and the number of links leaving that document are examined. Those documents that have a considerable number of documents linked to them are considered information authorities and those documents that are linked to a considerable number of documents are considered information hubs. Naturally, the greater the number of these links, the higher the quality (and ranking) of the document. As this method merely ranks the quality of the document and is topic independent, a topic dependant ranking method (such as the one described above) is typically utilized in conjunction with this quality-ranking method.

In an effort to further enhance the relevance of the list of documents generated in response to a query, search engines examine the words of the query entered and compare them to previous queries entered which included the same words. Naturally, this is a topic-dependant relevance ranking method that allows the search engine to further predict (or suggest) what additional search terms the user might want to include in the query.

SUMMARY

According to an aspect of this invention, an inferred relation weighting process for determining the strength of an inferred relation between a first and a second Internet object which are not directly linked includes a first link weighting process for determining the strength of at least a first link between the first non-directly linked Internet object and a common object. A second link weighting process determines the strength of at least a second link between the second non-directly linked Internet object and the common object. An inferred relation weight calculation process calculates the strength of the inferred relation based on the strength of the at least a first link and the at least a second link.

One or more of the following features may also be included. The common object includes a plurality of discrete Internet objects, each interconnected with a discrete link. The plurality of discrete Internet objects and links connect the first and second links, wherein the inferred relation weighting process further includes an intermediate link weighting process for determining the strength of each discrete link. The strength of the inferred relation is based on the strength of each discrete link and the strength of the at least a first link and the at least a second link. The common object includes at least one Internet query. The common object includes at least one Internet document. A link limitation process specifies a link limit concerning the maximum number of links allowed to connect the first and second non-directly linked Internet objects. The inferred relation weighting process includes an incoming link analysis process for determining the number of objects linked to each of the plurality of Internet objects, such that the incoming link value of each Internet object is directly proportional to the number of objects linked to that Internet object. The inferred relation weighting process includes an outgoing link analysis process for determining the number of objects that each of the plurality of Internet objects is linked to, such that the outgoing link value of each Internet object is directly proportional to the number of objects that that Internet object is linked to. The inferred relation weight calculation process includes a known relation recalculation process for redefining the values of the strength of each discrete link and the strength of the at least a first link and the at least a second link in response to the calculation of the strength of the inferred relation. At least one of the Internet objects is an Internet document, an Internet query, or a transaction record. The strength of the inferred link is a relevance score. The relevance score is a percentage.

According to a further aspect of this invention, an inferred relation weighting process for determining the strength of an inferred relation between a first and a second Internet object which are not directly linked includes a first link weighting process for determining the strength of at least a first link between the first non-directly linked Internet object and a plurality of common objects. A second link weighting process determines the strength of at least a second link between the second non-directly linked Internet object and the plurality of common objects. The plurality of common objects includes a first common object connected to the first link, a second common object connected to the second link, and an intermediate link interconnecting the first and second common objects. An intermediate link weighting process determines the strength of the intermediate link. An inferred relation weight calculation process calculates the strength of the inferred relation based on the strength of the at least a first link, the at least a second link, and the intermediate link.

One or more of the following features may also be included. The plurality of common objects includes at least one Internet document. A link limitation process specifies a link limit concerning the maximum number of links allowed to connect the first and second non-directly linked Internet objects. The intermediate link includes at least one additional common object and a plurality of sub-links for connecting these additional common objects to the first and second common objects, wherein the intermediate link weighting process determines the strength of the intermediate link based on the individual strengths of the sub-links. The inferred relation weighting process includes an incoming link analysis process for determining the number of objects linked to each of the plurality of Internet objects and each common object, such that the incoming link value of each Internet object and each common object is directly proportional to the number of objects linked to that object. The inferred relation weighting process includes an outgoing link analysis process for determining the number of objects that each of the plurality of Internet objects and each common object is linked to, such that the outgoing link value of each Internet object and each common object is directly proportional to the number of objects that that object is linked to. The inferred relation weight calculation process includes a known relation recalculation process for redefining the values of the strength of each sub-link and the strength of at least a first link and at least a second link in response to the calculation of strength of said inferred relation.

At least one of the Internet objects is an Internet document, an Internet query, or a transaction record. The strength of the inferred link is a relevance score. The relevance score is a percentage.

According to a further aspect of this invention, a method for determining the strength of an inferred relation between a first and a second Internet object which are not directly linked includes: determining the strength of at least a first link between the first non-directly linked Internet object and a common object; determining the strength of at least a second link between the second non-directly linked Internet object and the common object; and calculating the strength of the inferred relation based on the strength of the at least a first link and the at least a second link.

One or more of the following features may also be included. The common object includes a plurality of discrete Internet objects, each interconnected with a discrete link. The plurality of discrete Internet objects and links connect the first and second links, wherein determining the strength of the inferred relation further includes determining the strength of each discrete link, wherein the strength of the inferred relation is based on the strength of each discrete link and the strength of the at least a first link and the at least a second link. The common object includes at least one Internet document. The method for determining the strength of an inferred relation includes specifying a link limit concerning the maximum number of links allowed to connect the first and second non-directly linked Internet objects. The common object includes at least one Internet document.

According to a further aspect of this invention, a computer program product residing on a computer readable medium having a plurality of instructions stored thereon which, when executed by the processor, cause that processor to: determine the strength of at least a first link between the first non-directly linked Internet object and a common object; determine the strength of at least a second link between the second non-directly linked Internet object and the common object; and calculate the strength of the inferred relation based on the strength of the at least a first link and the at least a second link.

One or more of the following features may also be included. The computer readable medium is a random access memory (RAM), a read only memory (ROM), or a hard disk drive.

According to a further aspect of this invention, a processor and memory are configured to: determine the strength of at least a first link between the first non-directly linked Internet object and a common object; determine the strength of at least a second link between the second non-directly linked Internet object and the common object; and calculate the strength of the inferred relation based on the strength of the at least a first link and the at least a second link.

One or more of the following features may also be included. The processor and memory are incorporated into a personal computer, a network server, or a single board computer.

One or more advantages can be provided from the above. The existing schemes of searching for information on the Internet are combined to deliver more robust results. Relationships can be determined between Internet objects that are not directly linked. Non-existent links between Internet objects can be inferred as a result of examining these relationships. Further, during the process, the strength of existing relations can be revised.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

The Internet and the World Wide Web can be viewed as a collection of hyperlinked documents with search engines or portals as a primary interface for document retrieval. Search engines allow the user to enter a query and perform a search based on that query. A list of potential matches is then generated that provides links to potentially relevant documents. Portals typically offer to the user some form of index that allows the user to manually select the information they wish to retrieve. Typically, portals also offer some form of searching capability and search engines also offer some form indexing capability.

Figure 1:
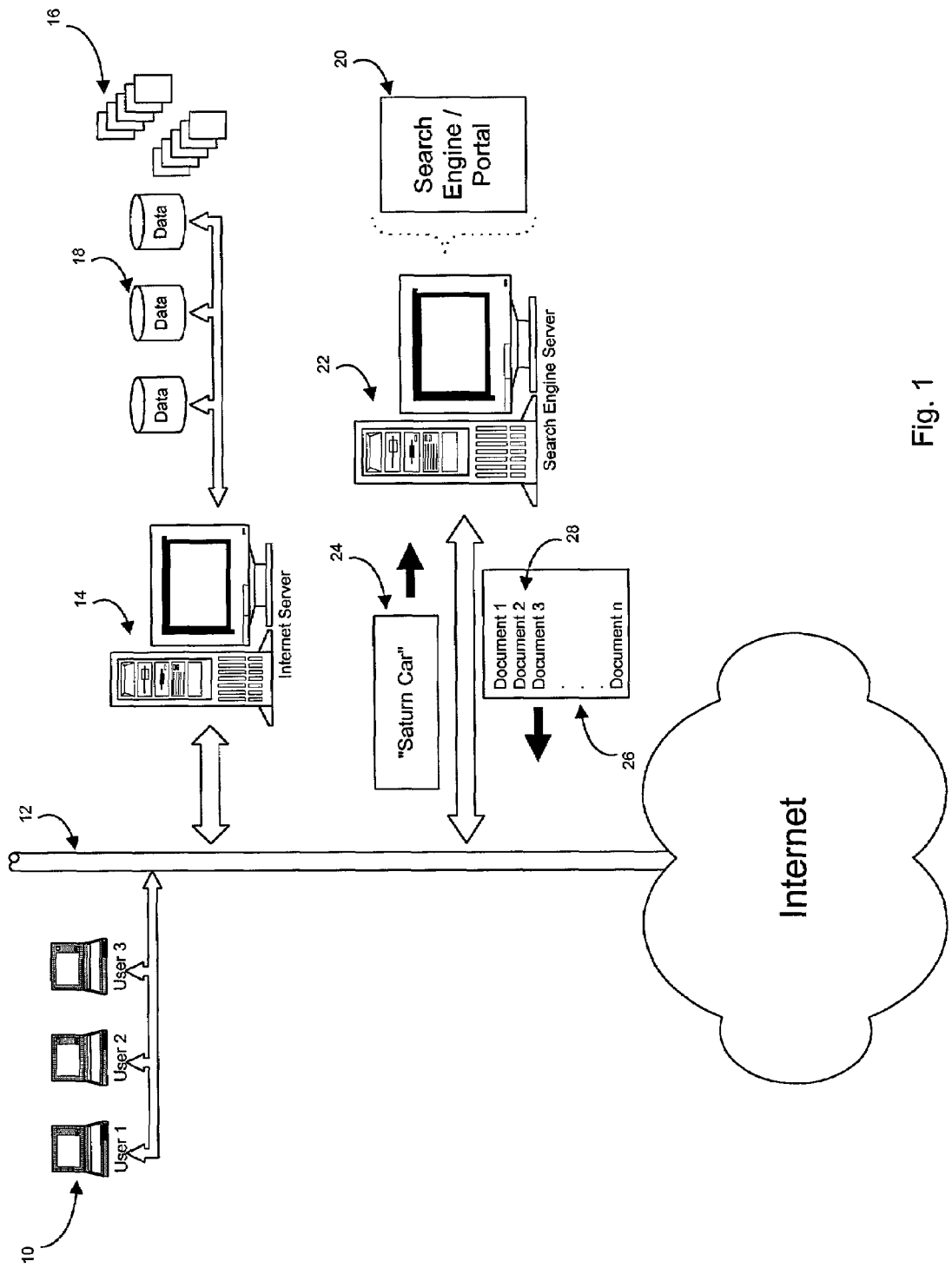
FIG. 1 is a diagrammatic view of the Internet.

Referring to FIG. 1, there is shown user 10 accessing the Internet via some form of network 12 that is connected to Internet server 14. These Internet servers 14 serve web pages and Internet-based documents 16 to users 10. Internet server 14 typically incorporates some form of database 18 to store and serve documents 16.

When user 10 wishes to search for information on a specific topic, user 10 utilizes search engine (or portal) 20 running on search engine server 22. User 10 enters query 24 into search engine 20, which provides a list 26 of potential sources for information related to the topic of query 24. For example, if user 10 entered the query "Saturn Car", list 26 would be generated which enumerates a series of documents that might provide information relating to the query entered. Each entry 28 on list 26 is a hyperlink to a specific relevant document (or web page) 16 on the Internet. These documents 16 may be located on search engine server 22, Internet server 14, or any other server on the Internet.

Search engine 20 determines the ranking of these entries 28 on list 26 by examining the documents themselves to determine certain factors, such as: the number of documents linked to each document; the number of documents that document is linked to; the presence of the query terms within the document itself; etc. This will result in a score (not shown) being generated for each entry, wherein these entries are ranked within list 26 in accordance with these scores.

Figure 2:
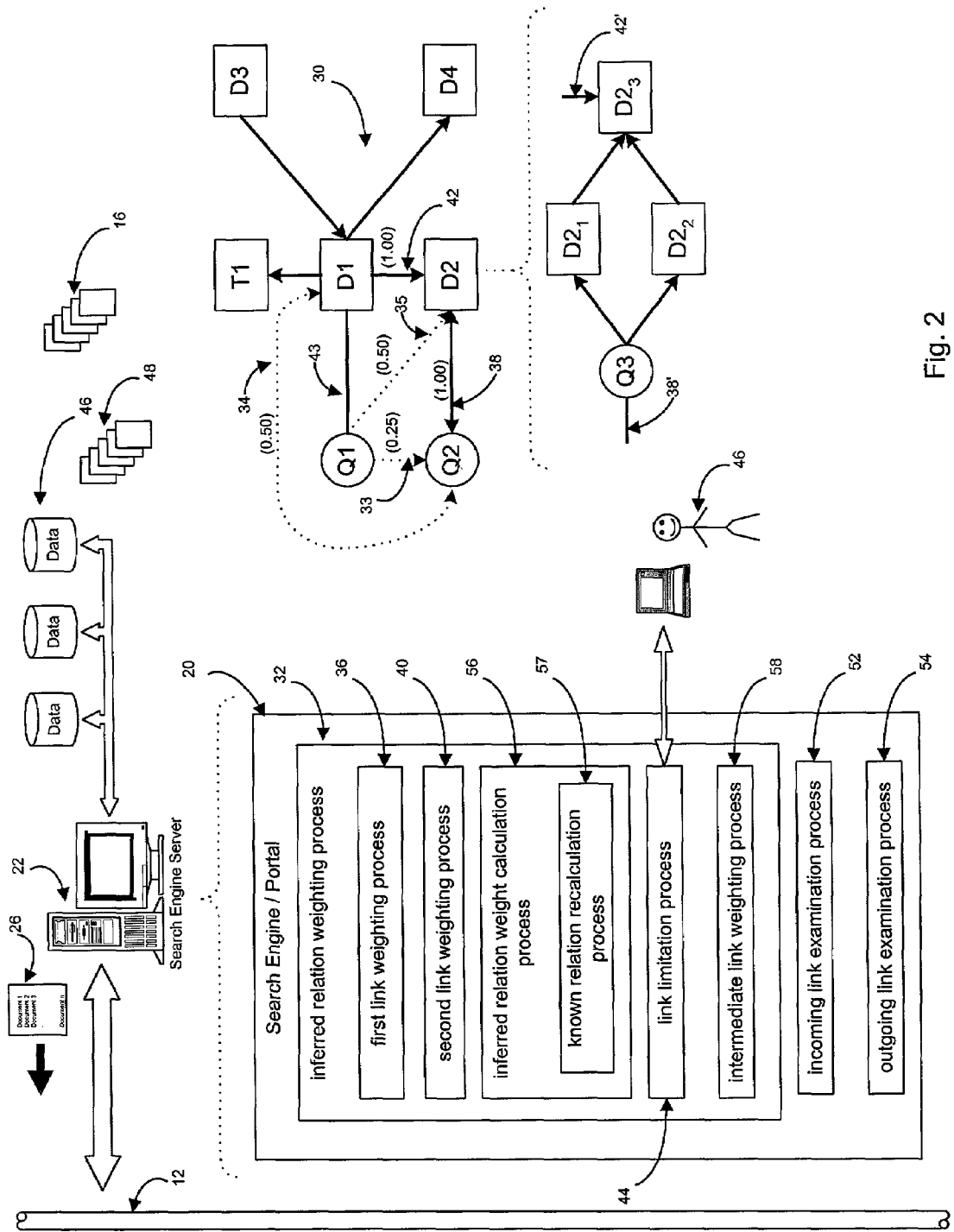
FIG. 2 is a diagrammatic view of the inferred relation weighting process.

Now referring to FIGS. 1 and 2, there is shown search engine (or portal) 20 that analyzes the hundreds of millions of documents 16 available to users of the Internet. These documents can be stored locally on server 22 or on any other server or combination of servers connected to network 12. As stated above, when search engine 20 provides list 26 to user 10 in response to query 24 being entered into search engine 20, the individual entries in list 26 will be arranged in accordance with their perceived level of relevance (or match). This relevance level is determined in a number of different ways, each of which examines the relationship between various Internet objects.

As a query contains specific search terms (e.g., "Saturn Car"), early search engines used to simply examine the number of times that these search terms appeared within the documents scanned by the search engine. Web designers typically incorporate hidden metatags into their web documents to bolster the position of their web page on list 26. Metatags simply are lines of code that redundantly recite the specific search terms that, if searched for by a user, the designer would like their web page to be listed high in the list 26 of potentially matching documents. For example, if a web designer wanted their web page to be ranked high in response to the query "Saturn Car", the designer may incorporate a metatag that recites the words "Saturn" and "car" 100 times each. Therefore, when the search engine scans this document (which is typically done off line and not in response to a search by a user), the large number of occurrences of the words "Saturn" and "car" will be noted and stored in the search engine's database. Accordingly, when a user enters this query into search engine 20, the document that contains this metatag will be highly ranked on this list. As easily realized, since the method of ranking simply examines the number of times a specific term appears in a document, the method does not in any way gauge the quality of the document itself.

Search engines are commonly used to search the web. These search engines send automated information-gathering computer programs called "spiders" all across the web to seek out available content. These programs "crawl" across the web (by following links from site to site) and index each site they visit. Each search engine uses its own set of criteria to decide what to include in its database. For example, some search engines index each page in a web site, while others index only one page.

After collecting the documents, these search engines build an internal representation of them. When a user types in a query, this internal representation is used to quickly find the documents that contain these words. For each word, all documents (from the set returned by the spiders) that contain that word are identified and stored. When users type in the query terms, the search engines scan the list of words to find all documents that contain all terms in the query (i.e., "Saturn" and "car").

Different search engines use different techniques to order the resulting lists. Usually simple statistical measures are used to compute the final score of a document with respect to a given query. The final score (or relevancy score) for each document is computed using the frequency of occurrence of the query term (or terms) in the document, its position within the document, and other various factors.

As easily realized, since this method of ranking simply examines the number of times a specific term appears in a document, the method does not in any way gauge the quality of the document itself.

In response to this shortcoming, search engines started exploring ways to measure the quality of a document by examining link information. A good indicator of the quality of a specific document is the number of documents that link to that specific document and the number of documents that specific document is linked to. This leads to a recursive definition in which the quality of a document depends on the quality of links that point to it.

Some search engines also started examining the click popularity of a document to detect and identify high quality document. Click popularity is a measure of the number of clicks received by each document in a search engine's results page. The assumption is that a good quality document for a given topic gets a lot of user clicks when it is returned as an item in the results set. Similarly, poor quality documents get relatively few user clicks.

Search engines also make use of query refinement techniques to further enhance their document ranking accuracy. These search engines compare stored queries (query-to-query relationships) to make suggestions to the user concerning modifications (or supplemental search terms) that would better tailor to the user's query to the specific information they are searching for. For example, if user 10 entered the query "Saturn" into search engine 20, it is unclear in which direction the user intends this search to proceed, as the word "Saturn" is indicative of a planet, a car company, and a home video game system. Using data collected from queries issued by previous users, search engine 20 can make an inquiry such as "Are you looking for information concerning: the planet Saturn; the car Saturn; or the video game system Saturn?" Depending on which selection user 10 makes, the user's search can be tailored accordingly. This further allows search engine 20 to return a relevant list of documents in response to the query being entered by user 10.

Please realize that both search engines and portals utilize the above listed sorting and ranking methods. While the discussion was primarily focused on queries and search engines, portals utilize these methods to determine the placement of documents within their indices.

Unfortunately, all of these various ranking criteria require the preexistence of a relationship between a query and a query, a query and a document, or a document and a document. Accordingly, if search engine 20 needed to rank the relevance of a link to document D1 in relation to query Q2 (an inferred relation) and the only information available to search engine 20 is the list of search results generated as a result of user 10 entering query Q1, search engine 20 would be unable to calculate such a relevance using the above-listed methods. While a quality rating is available for document D1, there is no information available concerning the relevance of document D1 in relation to query Q2.

Inferred relation weighting process 32 is capable of determining the strength of inferred relation 34 between a first Internet object (query Q2) and a second Internet object (document D1), wherein an Internet object is either a document, a query, or an ecommerce transaction record (transaction record T1) and an inferred relation is a relation between Internet objects which are not directly linked. Further, while the above-described ranking methods examine query-query relationships, document-document relationships, or query-document relationships, inferred relation weighting process 32 is uniquely capable of examining all of these relationships when determining the strength of this inferred relation 34. Accordingly, inferred relation weighting process 32 provides a unified framework to simultaneously exploit all types of known relations to infer unknown relations. Further, during this process, inferred relation weighting process 32 may refine/revise known relations.

A transaction record is merely a record of an ecommerce transaction. Just as queries can be cross referenced to demonstrate which query search terms are most often searched together, transaction records can be cross-referenced to show products that are commonly purchased together. Examples of these related products are: flashlights and batteries; shoes and socks; computer printers and paper; etc. Further, just as a link weight can be determined between a query and a document, a link weight can also be determined between a query and a transaction record. For example, a user issued a query Q1 and after visiting a first Internet document D1 (an ecommerce web page) that came up as a search result, the user made an online purchase which resulted in the generation of transaction record T1. Therefore, link weights can be determined between Q1 and D1, D1 and T1, and Q1 and T1.

Please note that there are two additional inferred relations 33 and 35 that would connect Q1 to Q2 and Q1 to D2 respectively. Depending on the objects specified to be analyzed, inferred relation weighting process 32 is capable of determining the strength of these inferred relations when the strength of inferred relation 34 is calculated.

Inferred relation weighting process 32 includes first link weighting process 36 that determines the strength of at least a first link 38 between the first non-directly linked Internet object (Q2) and a common object (D2). A second link weighting process 40 determines the strength of at least a second link 42 between the second non-directly linked Internet object (D1) and the common object (D2). While in this particular example, links 38 and 42 are shown as each being one link, if the common object (D2) actually consists of more than one discrete object, it is possible that each Internet object (D1 and Q2) would be connected to multiple discrete objects within common object D2. Therefore, more than one link would be required for each Internet object (Q2 and D1).

Typically, the strength ranking of the links between the common object (D2) and the individual non-linked Internet objects (Q2 and D1) can be in several forms. For example, it can be a relevancy score (or percentage) that varies between 0.00 and 1.00 or a binary relevance that has only two values (0 or 1). Alternatively, it can be in the form of a raw score based on various relevance features (such as the presence of query search terms within the document itself). This score may be normalized to make the calculation more manageable.

To ease in the explanation of the above-stated example, we will use a Boolean relevance link-weighting scheme (link values equal to 0 or 1). However, as stated above, please realize that these links usually have values that vary in relevance between 0.00 and 1.00. Additionally, while common object D2 is shown as being one object, this will vary depending on the documents available.

In order for inferred relation weighting system 32 to determine the strength of inferred relation 34 between two non-directly linked Internet objects, a series of links has to be established which connects these non-linked objects (Q2 and D1). In this example, a link is created between these two objects by utilizing links 38, 42 and common object D2. However, it may take several additional links to connect objects Q2 and D1 if the common object consists of multiple objects (e.g., $Q_3$, $D2_1$, $D2_2$, and $D2_3$) each interconnected with one or more links. In this scenario, object Q2 is connected to object Q3 via link 38'. Object Q3 is then connected to object $D2_3$ through either objects $D2_1$ or $D2_2$, wherein object $D2_3$ is connected to object D1 via link 42'. What must be realized is that this scenario, if left unchecked, would allow almost every document on the Internet to be linked to every other document on the Internet by simply jumping through an infinitely high number of discrete links. Accordingly, as the number of links required to link two non-linked objects increases, the relevancy of the inferred relation between these non-linked objects is substantially attenuated. Since it is often desirable to set a limit concerning the maximum number of links (or hops) that can be utilized to link non-directly linked Internet objects, inferred relation weighting process 32 includes a link limitation process 44 for specifying this limit. Typically, the administrator 46 of inferred relation weighting process 32 specifies this limit. This limitation is highly desirable, as the server processing power required to determine the weight of the inferred relation exponentially increases as the number of discrete links analyzed linearly increases.

As stated above, it is possible for common object D2 to consist of multiple discrete objects each interconnected with a discrete link. Since the weight (or strength) of inferred relation 34 (or any other inferred relation) is based on the strength of all links within the group of objects being analyzed, inferred relation weighting process 32 includes an intermediate link weighting process 58 for determining the strength of each discrete link within common object D2. Naturally, the strength of these discrete links, in conjunction with first and second links 38 and 42, will determine the strength of the inferred relations.

For the above-stated example and those that follow, assume that: query Q1 is the word "auto"; query Q2 is the word "Saturn"; documents D1, D3 and D4 are personal auto web pages; and document D2 is a Saturn car dealer's web page. Documents D1, D2, D3 and D4 are documents available somewhere on the Internet and queries Q1 and Q2 are queries that were previously run on search engine/portal 20. These queries are stored in the query records 48 on search engine database 50, wherein the hyperlink lists generated in response to these queries and the statistics concerning the use of these links are also stored in database 50. For the following examples, we will set the maximum number of links allowed to link two non-directly linked Internet objects equal to three. Therefore, via link limitation process 44, administrator 46 would configure inferred relation weighting process 32 to have a link limit of three.

EXAMPLE 1

For ease of illustration, this first example is only going to consider objects Q2, D1, and D2. If it was desired to consider all objects in the system (namely Q1, Q2, D1, D2, D3, and D4), the axes of the pertinent matrices could simply be expanded to include the additional objects. To provide a very clear and concise first example, a small group of objects were chosen. In light of the fact that the group of objects selected consists of only three objects, there is only one possible inferred relation, namely inferred relation 34.

Determining the Link Values:

As query Q2 is a previously-issued stored query, by examining query records 48 stored on search engine database 50, it is easily determined that 700 users who issued query Q2 visited document D2. This determination is made by first link weighting process 36, as this is the link between first Internet object Q2 and common object D2. Second link weighting process 40 determines the existence and strength of a second link 42 between second Internet object D1 and common object D2. To simplify this first example, we will set the weight of each known relation equal to one and the weight of each unknown relation equal to zero. Please note that while we could have chosen to utilize a normalized weighting scheme with real statistical or integer-based weights for each link, this would have made the example unduly cumbersome when compared to this Boolean weighting scheme.

Search engine/portal 20 may include an incoming link examination process 52 for determining the total number of Internet objects linked to a particular Internet object. As stated above, the greater this number is, the higher the incoming link value is for the object in question. Search engine/portal 20 may also include a outgoing link examination process 54 for determining the total number of Internet objects the particular Internet object is linked to. Again, the higher this number is, the higher the outgoing link value is for the object in question. These two values (outgoing link value and incoming link value) are indicative of the overall quality value of the object in question. Accordingly, to establish the quality ratings for documents D1 and D2, incoming link examination process 52 and outgoing link examination process 54 determine the number of objects linked to D1 and D2 and the number of objects D1 and D2 are linked to. Accordingly, it is determined that document D1 is linked to document D2.

The link weighting information we have is as follows: link Q2-D2 is a "1" since seven hundred people followed this link; and link D1→D2 is a "1" since there is a one directional link between these documents. Please note that while links between a query and a document are considered bi-directional for computational purposes, links between documents are considered mono-directional. Placing this link weighting information into a matrix yields the following matrix:

|  | Matrix 1 | | |
|---|---|---|---|
|  | Q2 | D1 | D2 |
| Q2 | 0 | 0 | 1 |
| D1 | 0 | 0 | 1 |
| D2 | 1 | 0 | 0 |

Please note that the leading diagonal (shown in bold) is set to zero so that a link from one node to itself will not be considered. In reality, the score for a link between an object and itself would have the highest possible score. However, for this example, we will set the weight of these links to zero. Concerning the above matrix, please realize that the left-most column indicates the starting point of a link and the top-most row indicates the ending point of a link. Accordingly, since link D1→D2 is a mono-directional link from D1 to D2, a "1" is placed only in cell (3,4) as opposed to cells (3,4) and (4,3).

Inferred relation weighting process 32 includes an inferred relation weight calculation process 56 for calculating the strength of inferred relation 34 based on the strength of the first and second links 38 and 42 (and any discrete links within the common object). Limiting the link distances to a length of three, inferred relation weight calculation process 56 will compute the final score (or Link Matrix) between all possible pairs of nodes. Therefore, inferred relation weight calculation process 56 will combine the maximum number of ways we can get from a first node of the system (A) to a second node of the system (B) utilizing one link (or hop), two links (or hops), or three links (or hops). These scores are then combined using a simple weighting scheme:

Link Matrix (node A→node B):=α.$X$+β.$Y$+γ.$Z$

Where:
 $X$ is the number of ways you can get to B from A by utilizing only one hop (the single hop matrix);
 $Y$ is the number of ways you can get to B from A by utilizing two hops (the two hop matrix); and
 $Z$ is the number of ways you can get to B from A by utilizing three hops (the three hop matrix).

Please realize that the values for α, β and γ are determined empirically. Typically, these values are set by system administrator 46 depending on how much importance he/she would like to assign to the single hop, double hop, and triple hop relations. Usually a decreasing weighting order is preferred so that single hops are given more weight than double hops, double hops are given more weight than triple hops, and so on. For this example, we will use the default values of 1.00, 0.50 and 0.25 respectively. Accordingly, the Link Matrix (node A→node B)=1.00$X$+0.50$Y$+0.25$Z$ Computing the Values of $X$, $Y$ and $Z$:

For single hops ($X$), Matrix 1 can be directly used to determine the number of ways we can get from a first node (A) to a second node (B) using only one hop. Specifically, wherever a "1" is entered into a cell of Matrix 1, this is indicative of being able to get from that cell's first node to that cell's second node with only one hop.

Hence, the single hop matrix ($X$) is:

|  | Matrix 2 | | |
|---|---|---|---|
|  | Q2 | D1 | D2 |
| Q2 | 0 | 0 | 1 |
| D1 | 0 | 0 | 1 |
| D2 | 1 | 0 | 0 |

For double hops ($Y$), squaring the single hop matrix will give us the number of ways we can get from one node to another within two hops. Therefore, $Y=X^2$ (the product of Matrix 2*Matrix 2).

|  | Q2 | D1 | D2 |
|---|---|---|---|
|  | $X^2 =$ | | |
| Q2 | 0 | 0 | 1 |
| D1 | 0 | 0 | 1 |
| D2 | 1 | 0 | 0 |
|  | $X$ | | |
| Q2 | 0 | 0 | 1 |
| D1 | 0 | 0 | 1 |
| D2 | 1 | 0 | 0 |

Hence, the double hop matrix ($Y$) is:

|  | Matrix 3 | | |
|---|---|---|---|
|  | Q2 | D1 | D2 |
| Q2 | 1 | 0 | 0 |
| D1 | 1 | 0 | 0 |
| D2 | 0 | 0 | 1 |

However, since for our model we don't want to consider scores between a node and itself, the leading diagonal for the matrix Y (or $X^2$) will be set to 0.

| Matrix 4 | | | |
|---|---|---|---|
|  | Q2 | D1 | D2 |
| Q2 | 0 | 0 | 0 |
| D1 | 1 | 0 | 0 |
| D2 | 0 | 0 | 0 |

For triple hops (Z), it is clear that since there are only three objects being linked and two actual links, there can be no triple hops which do not fold back upon themselves.

Hence, the triple hop (Z) matrix is:

| Matrix 5 | | | |
|---|---|---|---|
|  | Q2 | D1 | D2 |
| Q2 | 0 | 0 | 0 |
| D1 | 0 | 0 | 0 |
| D2 | 0 | 0 | 0 |

Thus, the sum of the one (X), two (Y), and three (Z) hop matrices will produce the Link Matrix between all possible node pairs (of those nodes in the group analyzed). Accordingly:

Link Matrix = $(\alpha)(X) + (\beta)(Y) + (\gamma)(Z)$

= $(1.00)(X) + (0.50)(Y) + (0.25)(Z)$

= $(1.00) *$

|  | Q2 | D1 | D2 |
|---|---|---|---|
| Q2 | 0 | 0 | 1 |
| D1 | 0 | 0 | 1 |
| D2 | 1 | 0 | 0 |

+ $(0.50) *$

|  | Q2 | D1 | D2 |
|---|---|---|---|
| Q2 | 0 | 0 | 0 |
| D1 | 1 | 0 | 0 |
| D2 | 0 | 0 | 0 |

+ $(0.25) *$

|  | Q2 | D1 | D2 |
|---|---|---|---|
| Q2 | 0 | 0 | 0 |
| D1 | 0 | 0 | 0 |
| D2 | 0 | 0 | 0 |

=

|  | Q2 | D1 | D2 |
|---|---|---|---|
| Q2 | 0.00 | 0.00 | 1.00 |
| D1 | 0.50 | 0.00 | 1.00 |
| D2 | 1.00 | 0.00 | 0.00 |

Matrix 6

Accordingly, for this example, the link weights are as follows:

Q2 → Q2 = 0.00    Q2 → D1 = 0.00    Q2 → D2 = 1.00
D1 → Q2 = 0.50    D1 → D1 = 0.00    D1 → D2 = 1.00
D2 → Q2 = 1.00    D2 → D1 = 0.00    D2 → D2 = 0.00

Therefore, the links are as follows:

Q2 ←→ D2 = 1.00    D1 → D2 = 1.00    D1 → Q2 = 0.50

Please note that link (D1→Q2) is an inferred relation in that it did not exist prior to inferred relation weighting process 32 processing the weight of the existing links (Q2←→D2 & D1→D2). Please also note that inferred relation 34 has a weight of 0.50 and is a mono-directional link in that it is a one directional link from D1→D2.

EXAMPLE 2

This second example is going to expand on the first example in that an additional object (Q1) will be analyzed. For ease of illustration, this example is only going to consider objects Q1, Q2, D1, and D2. If it is desired to consider all objects in the system (namely Q1, Q2, D1, D2, D3, and D4), the axes of the pertinent matrices could simply be expanded to include the additional objects. To provide a more elaborative and illustrative example, we will demonstrate how inferred relation weighting process 32 determines the value of all inferred relations (33, 34 and 35) within a system simultaneously (as opposed to simply calculating the value of a single inferred relation as in Example 1).

Determining the Link Values

It is important to note that in this second example, the common object now consists of two discrete Internet objects, namely Q1 and D2. Additionally, second Internet object D1 is now connected to the common object (the combination of Q1 and D2) with two discrete links, namely link 42 and link 43. As queries Q1 and Q2 are previously-issued stored queries, by examining query records 48 stored on search engine database 50, it is easily determined that 1000 users who issued query Q1 visited document D1 and 700 users who issued query Q2 visited document D2. Accordingly, first link weighting process 36 determines the existence and strength of first link 38, the link that connects first Internet object Q2 with the common object (the combination of Q1 and D2). Further, second link weighting process 40 determines the existence and strength of second link 42 between second Internet object D1 and the common object (the combination of Q1 and D2). Further, in this example, an additional link 43 connects second Internet object D1 and the common object (the combination of Q1 and D2). Therefore, second link weighting process 40 also determines the existence and strength of link 43.

To simplify this second example, we will set the weight of each known relation equal to one and the weight of each unknown relation equal to zero. Please note that while we could have chosen to utilize a normalized weighting scheme with real statistical or integer-based weights for each link, this would have made the example unduly cumbersome when compared to this Boolean weighting scheme.

As stated above, search engine/portal 20 may include an incoming link examination process 52 for determining the total number of Internet objects linked to a particular Internet object. The greater this number is, the higher the incoming link value is for the object in question. Search engine/portal 20 may also include a outgoing link examination process 54 for determining the total number of Internet objects the particular Internet object is linked to. Again, the higher this number is, the higher the outgoing link value is for the object in question. These two values (outgoing link value and incoming link value) are indicative of the overall quality value of the object in question. Accordingly, to establish the quality rankings for documents D1 and D2, incoming link examination process 52 and outgoing link examination process 54 determine the number of objects linked to D1 and D2 and the number of objects D1 and D2 are linked to. Accordingly, it is determined that document D1 is linked to document D2.

The link weighting information we have is as follows: link Q1-D1 is a "1" since one thousand users followed this link; link Q2-D2 is a "1" since seven hundred people followed this link; and link D1→D2 is a "1", since there is a one directional link between these documents. Please note that while links between a query and a document are considered bi-directional for computational purposes, links between documents are considered mono-directional. Placing this link weighting information into a matrix yields the following matrix:

Matrix 7

|  | Q1 | Q2 | D1 | D2 |
|---|---|---|---|---|
| Q1 | 0 | 0 | 1 | 0 |
| Q2 | 0 | 0 | 0 | 1 |
| D1 | 1 | 0 | 0 | 1 |
| D2 | 0 | 1 | 0 | 0 |

Please note that the leading diagonal (shown in bold) is set to zero so that the path from one node to itself will not be considered. In reality, the score for a link between an object and itself would have the highest possible score. However, for this example, we will set the weight of these links to zero. Concerning the above matrix, please realize that the leftmost column indicates the starting point of a link and the top-most row indicates the ending point of a link. Accordingly, since link D1→D2 is a mono-directional link from D1 to D2, a "1" is placed only in cell (4,5) as opposed to cells (4,5) and (5,4).

Inferred relation weight calculation process 56 calculates the strength of all inferred relations (33, 34 and 35) based on the strength of the existing links (38, 42 and 43). Additionally, since the common object consists of a plurality of discrete objects (Q1 and D2), intermediate link examination process 58 will examine the common object (Q1 and D2) to determine if there are any intermediate links connecting these discrete objects. If any of these intermediate links exist, the strength of these intermediate links will be used to calculate the strength of all of the inferred relations. However, in this particular example, there are no known relations between Q1 and D2.

As stated above, to provide a more illustrative example, the strength of all inferred relations within the system are being calculated simultaneously. Limiting the link distances to a length of three, inferred relation weight calculation process 56 will compute a Link Matrix to determine the strength of all possible links (both actual and inferred) between all the possible pairs of nodes. Therefore, inferred relation weight calculation process 56 will combine the number of ways you can get from a first node of the system (A) to a second node of the system (B) utilizing one link (or hop), two links (or hops), and three links (or hops). These scores are then combined using a simple weighting scheme:

Link Matrix (node A→node B)=$\alpha \cdot X + \beta \cdot Y + \gamma \cdot Z$

Where:

X is the number of ways you can get to B from A by utilizing only one hop;

Y is the number of ways you can get to B from A by utilizing two hops; and

Z is the number of ways you can get to B from A by utilizing three hops.

As above, the values for $\alpha$, $\beta$ and $\gamma$ are set empirically by running experiments but we will use the default values of 1.00, 0.50 and 0.25 respectively. Accordingly, the Link Matrix (node A→node B)=$1.00X+0.50Y+0.25Z$ Computing the Values of X, Y and Z:

For single hops (X), Matrix 7 can be directly used to determine the number of ways we can get from a first node (A) to a second node (B) using only one hop. Specifically, wherever a "1" is entered into a cell of Matrix 7, this is indicative of being able to get from that cell's first node to that cell's second node with only on hop. Accordingly, the single hop matrix (X) is as follows:

Matrix 8

|  | Q1 | Q2 | D1 | D2 |
|---|---|---|---|---|
| Q1 | 0 | 0 | 1 | 0 |
| Q2 | 0 | 0 | 0 | 1 |
| D1 | 1 | 0 | 0 | 1 |
| D2 | 0 | 1 | 0 | 0 |

For double hops (Y), squaring the single hop matrix will give us the number of ways you can get from one node to another within two hops. Therefore, $Y=X^2$ (the product of Matrix 8*Matrix 8).

Matrix 9

|  | Q1 | Q2 | D1 | D2 |
|---|---|---|---|---|
| $X^2 =$ | | | | |
| Q1 | 0 | 0 | 1 | 0 |
| Q2 | 0 | 0 | 0 | 1 |
| D1 | 1 | 0 | 0 | 1 |
| D2 | 0 | 1 | 0 | 0 |
| X | | | | |
| Q1 | 0 | 0 | 1 | 0 |
| Q2 | 0 | 0 | 0 | 1 |
| D1 | 1 | 0 | 0 | 1 |
| D2 | 0 | 1 | 0 | 0 |
| Hence, Y = | | | | |
| Q1 | 1 | 0 | 0 | 1 |
| Q2 | 0 | 1 | 0 | 0 |
| D1 | 0 | 1 | 1 | 0 |
| D2 | 0 | 0 | 0 | 1 |

However, since for our model we don't want to consider scores between a node and itself, the leading diagonal for the matrix $X^2$ (or Y) will be set to 0.

Matrix 10

|    | Q1 | Q2 | D1 | D2 |
|----|----|----|----|----|
| Q1 | 0  | 0  | 0  | 1  |
| Q2 | 0  | 0  | 0  | 0  |
| D1 | 0  | 1  | 0  | 0  |
| D2 | 0  | 0  | 0  | 0  |

For triple hops (Z), we have to examine the total number of ways that you can get from a first node (A) to a second node (B) using three hops. Specifically, they are as follows:

the number of "honest" (i.e. non repetitive) hops; plus
the number of possible paths that revisit "A" (e.g., A→X→A→B); plus
the number of possible paths that revisit "B" (e.g., A→B→X→B); minus
the number of oscillating paths (e.g., A→B→A→B).

Rearranging the equation to solve for "honest hops" yields:

the number of "honest" (i.e. non repetitive) hops; equals
the total number of ways to get from A to B in three hops; minus
the number of possible paths that revisit "A" (e.g., A→X→A→B); minus
the number of possible paths that revisit "B" (e.g., A→B→X→B); plus
the number of oscillating paths (e.g., A→B→A→B).

Placing this in equation forms yields:

$$\text{Matrix}(Z) = X^3 - DX - XD + X \circ X^T \circ X$$

where D=The Diagonal Elements of Matrix $X^2$;
$X^T$=The transpose of Matrix X; and
AoB=The Surr Product matrix of the individual matrices (e.g., if C=AoB, $C_{ij}=A_{ij} \times B_{ij}$)

Hence, the triple hop (Z) matrix is:

Matrix 11

|    | Q1 | Q2 | D1 | D2 |
|----|----|----|----|----|
| Q1 | 0  | 1  | 0  | 0  |
| Q2 | 0  | 0  | 0  | 0  |
| D1 | 0  | 0  | 0  | 0  |
| D2 | 0  | 0  | 0  | 0  |

Thus, the sum of the one (X), two (Y), and three (Z) hop matrices will produce the Link Matrix between all possible node pairs (of those nodes in the group analyzed). Accordingly:

Link Matrix = $(\alpha)(X) + (\beta)(Y) + (\gamma)(Z)$
= $(1.00)(X) + (0.50)(Y) + (0.25)(Z)$
= $(1.00) *$

|    | Q1 | Q2 | D1 | D2 |
|----|----|----|----|----|
| Q1 | 0  | 0  | 1  | 0  |
| Q2 | 0  | 0  | 0  | 1  |
| D1 | 1  | 0  | 0  | 1  |
| D2 | 0  | 1  | 0  | 0  |

+ (0.50) *

|    | Q1 | Q2 | D1 | D2 |
|----|----|----|----|----|
| Q1 | 0  | 0  | 0  | 1  |
| Q2 | 0  | 0  | 0  | 0  |
| D1 | 0  | 1  | 0  | 0  |
| D2 | 0  | 0  | 0  | 0  |

+ (0.25) *

|    | Q1 | Q2 | D1 | D2 |
|----|----|----|----|----|
| Q1 | 0  | 1  | 0  | 0  |
| Q2 | 0  | 0  | 0  | 0  |
| D1 | 0  | 0  | 0  | 0  |
| D2 | 0  | 0  | 0  | 0  |

=

|    | Q1   | Q2   | D1   | D2   |
|----|------|------|------|------|
| Q1 | 0.00 | 0.25 | 1.00 | 0.50 |
| Q2 | 0.00 | 0.00 | 0.00 | 1.00 |
| D1 | 1.00 | 0.50 | 0.00 | 1.00 |
| D2 | 0.00 | 1.00 | 0.00 | 0.00 |

Matrix 12

Accordingly, for this example, the link weights are as follows:

Q1 → Q1 = 0.00   Q1 → Q2 = 0.25   Q1 → D1 = 1.00   Q1 → D2 = 0.50
Q2 → Q1 = 0.00   Q2 → Q2 = 0.00   Q2 → D1 = 0.00   Q2 → D2 = 1.00
D1 → Q1 = 1.00   D1 → Q2 = 0.50   D1 → D1 = 0.00   D1 → D2 = 1.00
D2 → Q1 = 0.00   D2 → Q2 = 1.00   D2 → D1 = 0.00   D2 → D2 = 0.00

Therefore, the links are as follows:

Q1 ←→ D1 = 1.00   Q2 ←→ D2 = 1.00   D1 → D2 = 1.00
D1 → Q2 = 0.50    Q1 → Q2 = 0.25    Q1 → D2 = 0.50

Please note that links (D1→Q2), (Q1→Q2) and (Q1→D2) are inferred relations 34, 33, and 35 in that they did not exist prior to inferred relation weighting process 32 processing the weight of the existing links (Q1←→D1), (Q2←→D2) and (D1 →D2). Please also note that mono-directional inferred relation 33 has a weight of 0.25, mono-directional inferred relation 34 has a weight of 0.50, and mono-directional inferred relation 35 has a weight of 0.50.

It is important to note that inferred relation weighting process 32 utilizes known "explicit" relationships (i.e., known relation weights between Internet objects) to determine the strength of unknown "implicit" relationships (i.e., inferred relation weights between Internet objects). Further, this functionality allows for the refinement of these known relationships while inferring these unknown relationships. This feature is best illustrated via an example.

EXAMPLE 3

Figure 3:
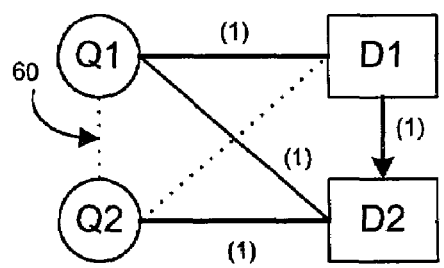
FIG. 3 is a diagrammatic view of linked Internet objects.
Figure 3:
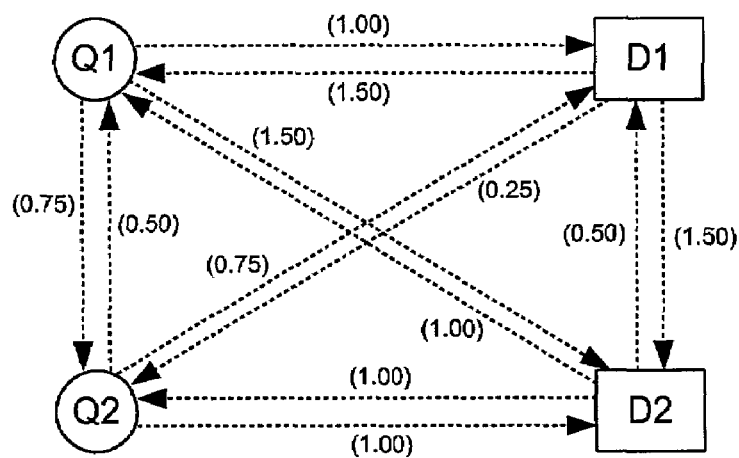

Now referring to FIG. 3, for this third example, we use the same set of objects as Examples 1 and 2 with one change, a link 60 is added between Q1 and D2. This establishes a cyclic relationship between Q1, D1 and D2, thus creating the typical scenario where we can refine known relationships based on the information obtained while inferring new relations.

The above-described relationships can be represented as the following matrix:

Matrix 13

|    | Q1 | Q2 | D1 | D2 |
|----|----|----|----|----|
| Q1 | 0  | 0  | 1  | 1  |
| Q2 | 0  | 0  | 0  | 1  |
| D1 | 1  | 0  | 0  | 1  |
| D2 | 1  | 1  | 0  | 0  |

Note that, as explained above, the leading diagnal is set to zero so that the path from one node to itself will not be considered. In reality, the score between an object and itself should have the highest score but these weights will not be considered during this computation.

As above, for this third example, we will limit the maximum number of links (or hops) to three. Therefore, inferred relation weight calculation process 56 will combine the number of ways you can get from a first node of the system (A) to a second node of the system (B) utilizing one link (or hop), two links (or hops), and three links (or hops). These scores are then combined using a simple weighting scheme:

Link Matrix (node A→node B)=$\alpha.X+\beta.Y+\gamma.Z$

Where:

X is the number of ways you can get to B from A by utilizing only one hop;

Y is the number of ways you can get to B from A by utilizing two hops; and

Z is the number of ways you can get to B from A by utilizing three hops.

As above, the values for $\alpha$, $\beta$ and $\gamma$ are set empirically by running experiments but we will use the default values of 1.00, 0.50 and 0.25 respectively. Accordingly, the Link Matrix (node A→node B)=1.00X+0.50Y+0.25Z Computing the Values of X, Y and Z:

For single hops (X), Matrix 13 can be directly used to determine the number of ways we can get from a first node (A) to a second node (B) using only one hop. Specifically, wherever a "1" is entered into a cell of Matrix 13, this is indicative of being able to get from that cell's first node to that cell's second node with only on hop. Accordingly, the single hop matrix (X) is as follows:

Matrix 14

|    | Q1 | Q2 | D1 | D2 |
|----|----|----|----|----|
| Q1 | 0  | 0  | 1  | 1  |
| Q2 | 0  | 0  | 0  | 1  |
| D1 | 1  | 0  | 0  | 1  |
| D2 | 1  | 1  | 0  | 0  |

For double hops (Y), squaring the single hop matrix will give us the number of ways you can get from one node to another within two hops. Therefore, $Y=X^2$ (the product of Matrix 14*Matrix 14).

Matrix 15

$X^2 =$

|    | Q1 | Q2 | D1 | D2 |
|----|----|----|----|----|
| Q1 | 0  | 0  | 1  | 1  |
| Q2 | 0  | 0  | 0  | 1  |
| D1 | 1  | 0  | 0  | 1  |
| D2 | 1  | 1  | 0  | 0  |

$X$

|    | Q1 | Q2 | D1 | D2 |
|----|----|----|----|----|
| Q1 | 0  | 0  | 1  | 1  |
| Q2 | 0  | 0  | 0  | 1  |
| D1 | 1  | 0  | 0  | 1  |
| D2 | 1  | 1  | 0  | 0  |

Hence, Y =

|    | Q1 | Q2 | D1 | D2 |
|----|----|----|----|----|
| Q1 | 2  | 1  | 0  | 1  |
| Q2 | 1  | 1  | 0  | 0  |
| D1 | 1  | 1  | 1  | 1  |
| D2 | 0  | 0  | 1  | 2  |

However, since for our model we don't want to consider scores between a node and itself, the leading diagonal for the matrix $X^2$ (or Y) will be set to 0.

Matrix 16

|    | Q1 | Q2 | D1 | D2 |
|----|----|----|----|----|
| Q1 | 0  | 1  | 0  | 1  |
| Q2 | 1  | 0  | 0  | 0  |
| D1 | 1  | 1  | 0  | 1  |
| D2 | 0  | 0  | 1  | 0  |

For triple hops (Z), we have to examine the total number of ways that you can get from a first node (A) to a second node (B) using three hops. Specifically, they are as follows:

the number of "honest" (i.e. non repetitive) hops; plus the number of possible paths that revisit "A" (e.g., A→X→A→B); plus the number of possible paths that revisit "B" (e.g., A→B→X→B); minus the number of oscillating paths (e.g., A→B→A→B).

Rearranging the equation to solve for "honest hops" yields:

the number of "honest" (i.e. non repetitive) hops; equals the total number of ways to get from A to B in three hops; minus the number of possible paths that revisit "A" (e.g., A→X→A→B); minus the number of possible paths that revisit "B" (e.g., A→B→X→B); plus the number of oscillating paths (e.g., A→B→A→B).

Placing this in equation forms yields:

Matrix $(Z) = X^3 - DX - XD + XoX^ToX$ where D=The Diagonal Elements of Matrix $X^2$;

$X^T$=The transpose of Matrix X; and

AoB=The Surr Product matrix of the individual matrices (e.g., if C=AoB, $C_{ij}=A_{ij} \times B_{ij}$)

Hence, the triple hop (Z) matrix is:

Matrix 17

|    | Q1 | Q2 | D1 | D2 |
|----|----|----|----|----|
| Q1 | 0  | 1  | 0  | 0  |
| Q2 | 0  | 0  | 1  | 0  |
| D1 | 0  | 1  | 0  | 0  |
| D2 | 0  | 0  | 0  | 0  |

Thus, the sum of the one (X), two (Y), and three (Z) hop matrices will produce the Link Matrix between all possible node pairs (of those nodes in the group analyzed). Accordingly:

Link Matrix = $(\alpha)(X) + (\beta)(Y) + (\gamma)(Z)$
= $(1.00)(X) + (0.50)(Y) + (0.25)(Z)$
= $(1.00) *$

|    | Q1 | Q2 | D1 | D2 |
|----|----|----|----|----|
| Q1 | 0  | 0  | 1  | 1  |
| Q2 | 0  | 0  | 0  | 1  |
| D1 | 1  | 0  | 0  | 1  |
| D2 | 1  | 1  | 0  | 0  |

+ (0.50) *

|    | Q1 | Q2 | D1 | D2 |
|----|----|----|----|----|
| Q1 | 0  | 1  | 0  | 1  |
| Q2 | 1  | 0  | 0  | 0  |
| D1 | 1  | 1  | 0  | 1  |
| D2 | 0  | 0  | 1  | 0  |

+ (0.25) *

|    | Q1 | Q2 | D1 | D2 |
|----|----|----|----|----|
| Q1 | 0  | 1  | 0  | 0  |
| Q2 | 0  | 0  | 1  | 0  |
| D1 | 0  | 1  | 0  | 0  |
| D2 | 0  | 0  | 0  | 0  |

=

|    | Q1   | Q2   | D1   | D2   |
|----|------|------|------|------|
| Q1 | 0.00 | 0.75 | 1.00 | 1.50 |
| Q2 | 0.50 | 0.00 | 0.25 | 1.00 |
| D1 | 1.50 | 0.75 | 0.00 | 1.50 |
| D2 | 1.00 | 1.00 | 0.50 | 0.00 |

Matrix 18

Accordingly, for third example, the link weights are as follows:

Q1 → Q1 = 0.00  Q1 → Q2 = 0.75  Q1 → D1 = 1.00  Q1 → D2 = 1.50
Q2 → Q1 = 0.50  Q2 → Q2 = 0.00  Q2 → D1 = 0.25  Q2 → D2 = 1.00
D1 → Q1 = 1.50  D1 → Q2 = 0.75  D1 → D1 = 0.00  D1 → D2 = 1.50
D2 → Q1 = 1.00  D2 → Q2 = 1.00  D2 → D1 = 0.50  D2 → D2 = 0.00

Inferred relation weight calculation process 56 includes a known relation recalculation process 57 for redefining the values of the known relationships in response to the calculation of the inferred relations. Specifically, this recalculation process 57 occurs as a byproduct of the processing of the algorithm that determines the inferred relations.

These inferred relation weights are shown graphically in FIG. 3. Please note that the known relationship between Q2 and D2 has been refined by known relation recalculation process 57. Further, we now have a bi-directional relationship between Q1 and D2, in that: Q1→D2 has a link weight of 1.50; and D2→Q1 has a link weight of 1.00.

These mismatched bi-directional link weights are reasonable to expect since, for example, the relationship from a query Q1 (such as the query "saturn") to a document D2 (such as a document about cars) might have a score of 1.50. However, if the document contains additional information that does not pertain to Saturn cars, the relationships from document D2 to query Q1 might only have a score of 1.00

Figure 4:
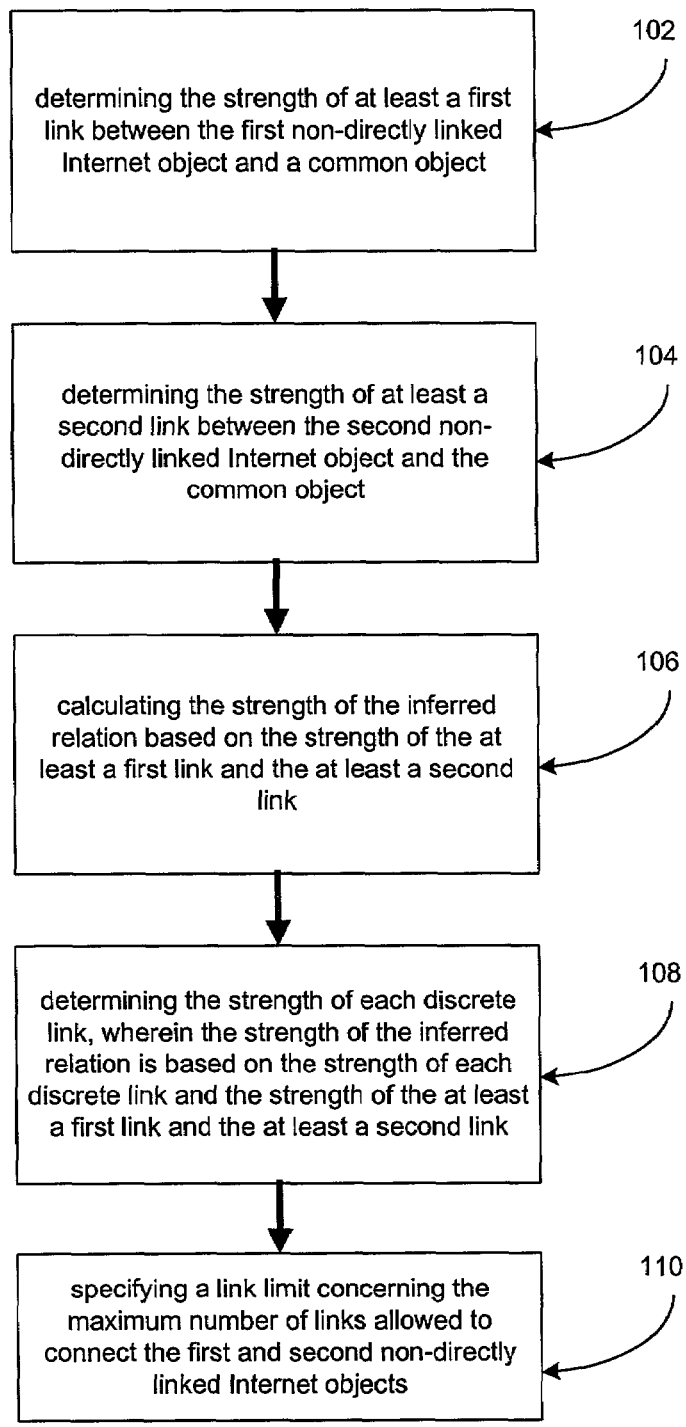
FIG. 4 is a flow chart of the inferred relation weighting method.

Now referring to FIG. 4, there is shown a method 100 for determining the strength of an inferred relation between a first and a second Internet object that are not directly linked. A first link weighting process determines 102 the strength of at least a first link between the first non-directly linked Internet object and a common object. A second link weighting process determines 104 the strength of at least a second link between the second non-directly linked Internet object and the common object. An inferred relation weight calculation process calculates 106 the strength of the inferred relation based on the strength of the at least a first link and the at least a second link.

Figure 5:
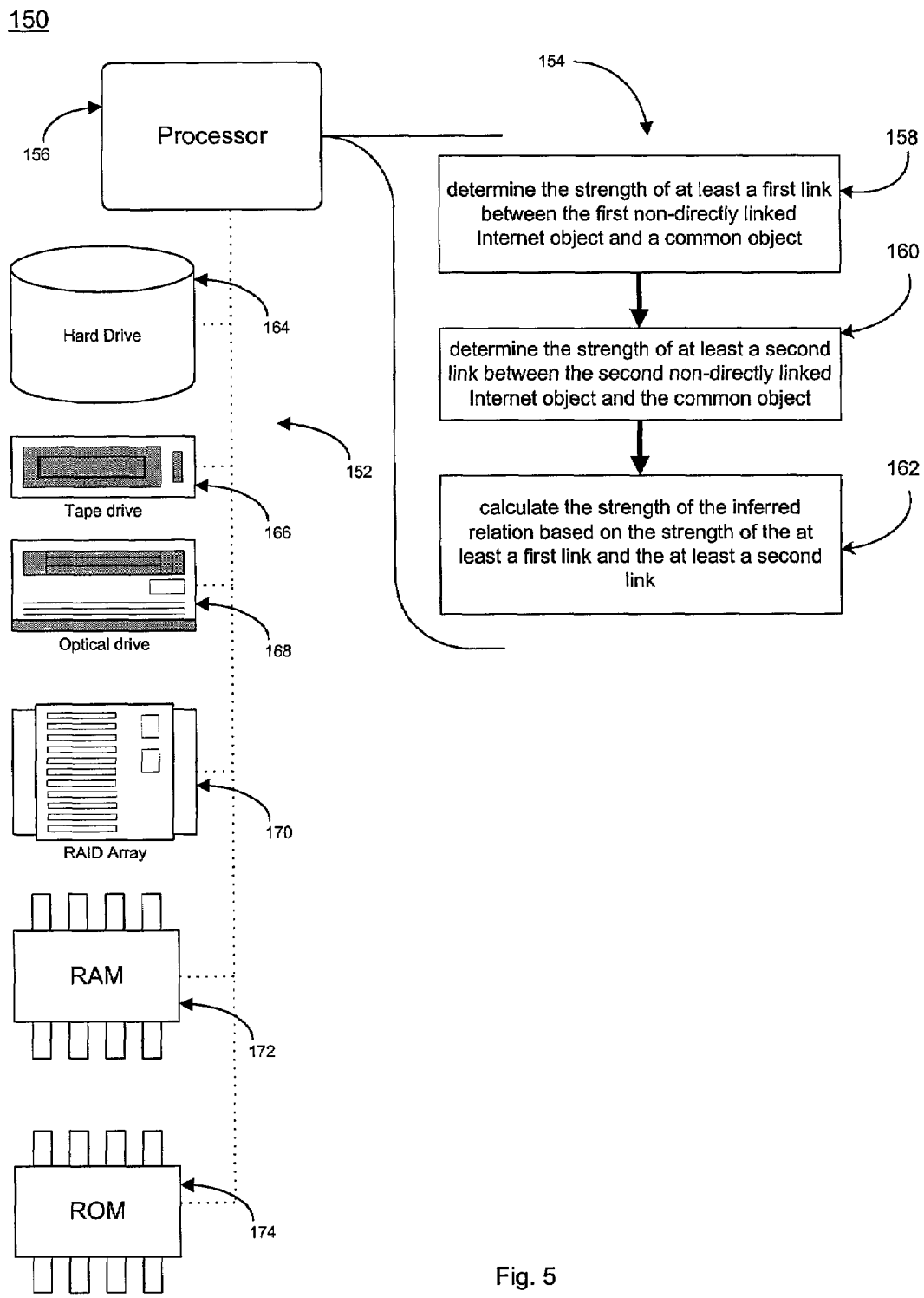
FIG. 5. is a diagrammatic view of another embodiment of the inferred relation weighting process, including a processor and a computer readable medium, and a flow chart showing a sequence of steps executed by the processor.

The common object includes a plurality of discrete Internet objects, each interconnected with a discrete link, and the plurality of discrete Internet objects and links connect the first and second links. An intermediate link weighting process determines 108 the strength of each discrete link, wherein the strength of the inferred relation is based on the strength of each discrete link and the strength of the at least a first link and the at least a second link. The common object includes at least one Internet document. A link limitation process specifies 110 a link limit concerning the maximum number of links allowed to connect the first and second non-directly linked Internet objects Now referring to FIG. 5, there is shown a computer program product 150 residing on a computer readable medium 152 having a plurality of instructions 154 stored thereon. When executed by processor 156, instructions 154 cause processor 156 to determine 158 the strength of at least a first link between the first non-directly linked Internet object and a common object. Computer program product 150 determines 160 the strength of at least a second link between the second non-directly linked Internet object and the common object. Computer program product 150 then calculates 162 the strength of the inferred relation based on the strength of the at least a first link and the at least a second link.

Typical embodiments of computer readable medium 152 are: hard drive 164; tape drive 166; optical drive 168; RAID array 170; random access memory 172; and read only memory 174.

Figure 6:
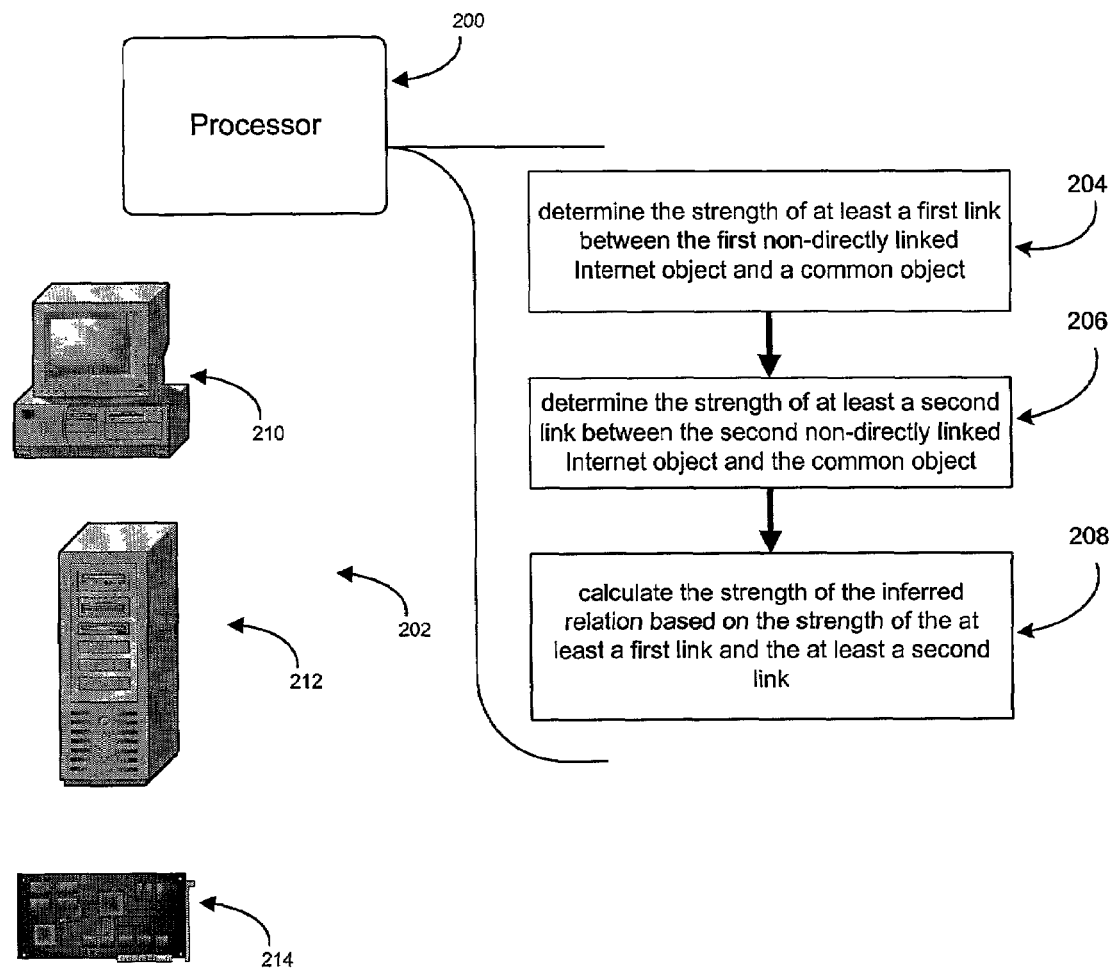
FIG. 6. is a diagrammatic view of another embodiment of the inferred relation weighting process, including a processor and memory, and a flow chart showing a sequence of steps executed by the processor and memory.

Now referring to FIG. 6, there is shown a processor 200 and memory 202 configured to determine 204 the strength of at least a first link between the first non-directly linked Internet object and a common object. Processor 200 and memory 202 determine 206 the strength of at least a second link between the second non-directly linked Internet object and the common object. Processor 200 and memory 202 then calculate 208 the strength of the inferred relation based on the strength of the at least a first link and the at least a second link.

Processor 200 and memory 202 may be incorporated into a personal computer 210, a network server 212, or a single board computer 214.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented inferred relation weighting process for determining a strength of an inferred relation between a first internet object and a second Internet object, where the first and second Internet objects are not directly linked, comprising:
   a first link weighting process for determining a first strength of a first link between the first Internet object and a common object;
   a second link weighting process for determining a second strength of a second link between the second Internet object and the common object, the first and second link weighting processes being performed by one or more processors; and
   an inferred relation weight calculation process for determining the strength of inferred relation based on the first strength and the second strength;
   wherein the first Internet object comprises a query for retrieving a document and the second Internet object comprises a document, the inferred relation weight calculation process comprising:
      determining a first array having entries comprising the first and second strengths;
      determining a second array as a mathematical function of the first array, wherein the first and second arrays are stored in memory;
      determining a weighted sum of entries selected from the first and second arrays, the weighted sum corresponding to the strength of the inferred relation; and
      returning a group of Internet objects associated with the first Internet object to a user, the group including the second Internet object, the second Internet object being arranged within the group according to the strength of the inferred relation.

2. The inferred relation weighting process of claim 1, wherein the common object comprises a plurality of Internet objects, the plurality of Internet objects being interconnected via discrete links, the plurality of Internet objects being connected to the first and second links; and
   wherein said inferred relation weighting process further comprises:
      an intermediate link weighting process for determining a strength of each discrete link, wherein the strength of the inferred relation is based on a strength of each discrete link.

3. The inferred relation weighting process of claim 1, wherein the common object comprises at least one Internet document.

4. The inferred relation weighting process of claim 2, further comprising:
   a link limitation process for specifying a link limit concerning a maximum number of links used to determine the inferred relation.

5. The inferred relation weighting process of claim 2, further comprising:
   an incoming link analysis process for determining a number of objects linked to each Internet object, wherein an incoming link value of a target Internet object is proportional to a number of objects linked to the target Internet object.

6. The inferred relation weighting process of claim 2, further comprising:
   an outgoing link analysis process for determining a number of objects that each Internet object is linked to, wherein an outgoing link value of a target Internet object is proportional to a number of objects to which the target Internet object is linked.

7. The inferred relation weighting process of claim 2, wherein the inferred relation weight calculation process comprises a relation recalculation process for redefining values corresponding to strengths of discrete links and to the first and second strengths in response to calculation of the strength of the inferred relation.

8. The inferred relation weighting process of claim 1, wherein at least one of the Internet objects is a transaction record.

9. The inferred relation weighting process of claim 1, wherein at least one of the Internet objects comprises an Internet document.

10. The inferred relation weighting process of claim 1, wherein the strength of the inferred relation corresponds to a relevance score.

11. The inferred relation weighting process of claim 8, wherein the relevance score comprises a percentage.

12. A computer-implemented inferred relation weighting process for determining a strength of an inferred relation between a first Internet object and a second Internet object, where the first and second Internet objects are not directly linked, comprising:
   a first link weighting process for determining a first strength of a first link between the first Internet object and a plurality of common objects;
   a second link weighting process for determining a second strength of a second link between the second Internet object and the plurality of common objects, wherein the plurality of common objects comprises a first common object connected to the first link, a second common object connected to the second link, and an intermediate link between the first and second common objects;

an intermediate link weighting process for determining a strength of the intermediate link, the first, second, and intermediate link weighting processes being performed by one or more processors;

an inferred relation weight calculation process for determining the strength of the inferred relation based on the first strength, the second strength, and the strength of the intermediate link;

wherein the first Internet object comprises a query for retrieving a document and the second Internet object comprises a document, the inferred relation weight calculation process comprising:

determining a first array having entries comprising the first and second strengths;

determining a second array as a mathematical function of the first array, wherein the first and second arrays are stored in memory;

determining a weighted sum of entries selected from the first and second arrays, the weighted sum corresponding to the strength of the inferred relation; and returning a group of Internet objects associated with the first Internet object, the group including the second Internet object, the second Internet object being arranged within the group according to the strength of the inferred relation.

13. The inferred relation weighting process of claim 12, further comprising:

a link limitation process for specifying a link limit concerning a maximum number of links used to determine the inferred relation.

14. The inferred relation weighting process of claim 12, wherein the plurality of common objects comprises at least one Internet document.

15. The inferred relation weighting process of claim 12, wherein the intermediate link comprises at least one additional common object and a plurality of sub-links for connecting the at least one additional common object to the first and second common objects; and wherein the intermediate link weighting process determines the strength of the intermediate link based on the individual strengths of the sub-links.

16. The inferred relation weighting process of claim 15, further comprising:

an incoming link analysis process for determining a number of objects linked to each Internet object and common object, wherein an incoming link value of a target object is proportional to number of objects linked to the target object.

17. The inferred relation weighting process of claim 15, further comprising:

an outgoing link analysis process for determining a number of objects that each Internet object and common object is linked to, wherein an outgoing link value of a target object is proportional to a number of objects to which the target object is linked.

18. The inferred relation weighting process of claim 15, wherein the inferred relation weight calculation process comprises a relation recalculation process for redefining values corresponding to strengths of the sub-links and to the first and second strengths in response to calculation of the strength of the inferred relation.

19. The inferred relation weighting process of claim 12, wherein at least one of the Internet objects comprises a transaction record.

20. The inferred relation weighting process of claim 12, wherein at least one of the Internet objects comprise an Internet document.

21. The inferred relation weighting process of claim 12, wherein the strength of the inferred relation corresponds to a relevance score.

22. The inferred relation weighting process of claim 21, wherein the relevance score comprises a percentage.

23. A computer-implemented method for determining a strength of an inferred relation between a first Internet object and a second Internet object, where the first and second Internet objects are not directly linked, the method comprising:

determining a first strength of a first link between the first Internet object and a common object;

determining a second strength of a second link between the second Internet object and the common object;

determining a strength of the inferred relation based on the first strength and the second strength, wherein the first strength, the second strength, and the strength of the inferred relation are determined by one or more processors;

wherein the first Internet object comprises a query for retrieving a document and the second Internet object comprises a document, and wherein calculating a strength of the inferred relation comprises:

determining a first array having entries comprising the first and second strengths;

determining a second array as a mathematical function of the first array; and determining a weighted sum of entries selected from the first and second arrays, wherein the first and second arrays are stored in memory, the weighted sum corresponding to the strength of the inferred relation; and returning a group of Internet objects associated with the first Internet object, the group including the second Internet object, the second Internet object being arranged within the group according to the strength of the inferred relation.

24. The method of claim 23, wherein the common object comprises a plurality of Internet objects, the plurality of Internet objects being connected via discrete links, wherein determining the strength of the inferred relation further comprises:

determining a strength of each discrete link, wherein the strength of the inferred relation is based also on a strength of each discrete link.

25. The method of claim 24, further comprising:

specifying a link limit concerning a maximum number of links used to determine the inferred relation.

26. A machine-readable medium for storing instructions for implementing an inferred relation weighting process, the inferred relation weighting process for determining a strength of an inferred relation between a first Internet object and a second Internet object, where the first and second Internet objects are not directly linked, wherein the instructions, when executed by a processor, cause the processor to:

determine a first strength of a first link between the first Internet object and a common object;

determine a second strength of a second link between the second Internet object and the common object;

determine the strength of the inferred relation based on the first strength and the second strength by:

determining a first array having entries comprising the first and second strengths;

determining a second array as a mathematical function of the first array; and determining a weighted sum of entries selected from the first and second arrays, the weighted sum corresponding to the strength of the inferred relation; wherein the first Internet object comprises a query for retrieving a document and the second Internet object comprises a document; and return a group of Internet objects associated with the first Internet object, the group including the second Internet object, the second Internet object being arranged within the group according to the strength of the inferred relation.

27. The machine-readable medium of claim 26, wherein the machine-readable medium comprises a random access memory (RAM).

28. The machine-readable medium of claim 26, wherein the machine-readable medium comprises a read only memory (ROM).

29. The machine-readable medium of claim 26, wherein the machine-readable medium comprises a hard disk drive.

30. An apparatus for executing an inferred relation weighting process for determining a strength of an inferred relation between a first Internet object and a second Internet object, where the first and second Internet objects are not directly linked, the apparatus comprising:

memory to store instructions that are executable; and at least one processing device to execute the instructions to:

determine a first strength of a first link between the first Internet object and a common object;

determine a second strength of a second link between the second Internet object and the common object; and determine the strength of the inferred relation based on the first strength and the second strength by:

determining a first array having entries comprising the first and second strengths;

determining a second array as a mathematical function of the first array;

determining a weighted sum of entries selected from the first and second arrays, the weighted sum corresponding to the strength of the inferred relation;

wherein the first Internet object comprises a query for retrieving a document and the second Internet object comprises a document; and returning a group of Internet objects associated with the first Internet object, the group including the second Internet object, the second Internet object being arranged within the group according to the strength of the inferred relation.

31. The apparatus of claim 30, wherein the processor and memory are part of into a personal computer.

32. The apparatus of claim 30, wherein the processor and memory are part of into a network server.

33. The apparatus of claim 30, wherein the processor and memory are part into a single board computer.

* * * * *